(12) United States Patent
Saito et al.

(10) Patent No.: US 7,355,750 B2
(45) Date of Patent: Apr. 8, 2008

(54) IMAGE PROCESSING APPARATUS, IMAGE PROCESSING METHOD AND IMAGE PROCESSING PROGRAM

(75) Inventors: Kazuhiro Saito, Kanagawa (JP); Hiroshi Mori, Kanagawa (JP); Mitsuru Uratani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 10/438,808

(22) Filed: May 16, 2003

(65) Prior Publication Data

US 2003/0214686 A1 Nov. 20, 2003

(30) Foreign Application Priority Data

May 20, 2002 (JP) ............................. 2002-145207

(51) Int. Cl.
*H04N 1/56* (2006.01)
*H04N 1/60* (2006.01)
*G06K 9/00* (2006.01)

(52) U.S. Cl. ...................... 358/1.9; 358/504; 358/515; 358/518; 358/523; 382/162; 382/167

(58) Field of Classification Search ................ 358/1.9, 358/296, 529, 518, 521, 520, 504, 515, 523; 382/162, 167

See application file for complete search history.

(56) References Cited

U.S. PATENT DOCUMENTS

| | | | | |
|---|---|---|---|---|
| 5,774,146 A | | 6/1998 | Mizutani | ...................... 347/43 |
| 5,835,243 A | | 11/1998 | Mori | ........................... 358/518 |
| 5,838,465 A | * | 11/1998 | Satou et al. | ................. 358/520 |
| 6,084,689 A | * | 7/2000 | Mo | ............................ 358/1.9 |
| 6,118,550 A | * | 9/2000 | Hayashi | ...................... 358/296 |
| 6,563,602 B1 | | 5/2003 | Uratani et al. | ............... 358/1.9 |
| 2002/0054306 A1 | | 5/2002 | Ilda et al. | ..................... 358/1.9 |
| 2003/0069712 A1 | | 4/2003 | Saito | ......................... 702/127 |
| 2003/0151667 A1 | * | 8/2003 | Nakami et al. | .......... 348/207.1 |

FOREIGN PATENT DOCUMENTS

| | | |
|---|---|---|
| EP | 1 168 822 A1 | 1/2002 |
| EP | 1 168 825 A1 | 1/2002 |
| JP | 2000-253266 | 9/2000 |
| JP | 2001-346054 | 12/2001 |

* cited by examiner

*Primary Examiner*—Kimberly Williams
*Assistant Examiner*—Charlotte M. Baker
(74) *Attorney, Agent, or Firm*—Fitzpatrick, Cella, Harper & Scinto (57) ABSTRACT

An image processing apparatus in which an appropriate color separation table is selected for an unexpected print medium. In plural color separation tables 108, maximum total color-material color discharge amounts are set to be stepwisely different. A γ correction table 109 is used upon correction of γ characteristics of the respective color-material colors regarding a print medium. A maximum total ink-amount calculation unit 110 calculates a maximum value of total ink amount for each color separation table 108 by using the γ correction table 109. A color separation table selector 107 determines a maximum value approximate to a value set by a maximum total ink-amount setting unit 106 from the calculated maximum values, and selects a color separation table corresponding to the determined maximum value. A color separation processor 102 performs processing based on the selected color separation table.

19 Claims, 10 Drawing Sheets

| COLOR SEPARATION TABLE ID | CALCULATED MAXIMUM TOTAL INK AMOUNT |
|---|---|
| A | 200% |
| B | 220% |
| C | 240% |
| D | 260% |
| E | 280% |
| ⋮ | ⋮ |

IMAGE PROCESSING APPARATUS, IMAGE PROCESSING METHOD AND IMAGE PROCESSING PROGRAM

BACKGROUND OF THE INVENTION

The present invention relates to an image processing apparatus for color image formation apparatus, an image processing method and an image processing program, and more particularly, to selection of color separation table for separating a color image signal into color-material (ink or toner) colors used in a color image formation apparatus.

In a color printer or the like, various colors are reproduced by using a limited number (e.g. 4 or 7) of color materials. For example, in an ink-jet color printer using CMYK inks, various neutral colors can be represented on a print medium by appropriately controlling C-ink discharge amount, M-ink discharge amount, Y-ink discharge amount and K-ink discharge amount.

In this manner, a large number of colors can be represented by controlling the respective YMCK ink discharge amounts, however, the respective ink-discharge amounts are different for representation of respective colors. For this reason, the total ink amount differs depending on represented color, grayscale level and the like. The total ink amount means the total sum of the respective ink discharge amounts necessary for representation of a color.

Some color can be represented with a small total ink amount, but some can be represented with a large total ink amount. This means a color requiring a minimum total ink amount and a color requiring a maximum total ink amount are included in colors in CMYK color space. Especially, upon ink discharge when the total ink amount is the maximum value, attention must be paid to ink overflow. As an absorbable ink amount (allowable discharge amount) of print medium is physically determined, the discharge amounts must be controlled such that the total ink amount does not exceed the absorbable ink amount.

Figure 10:
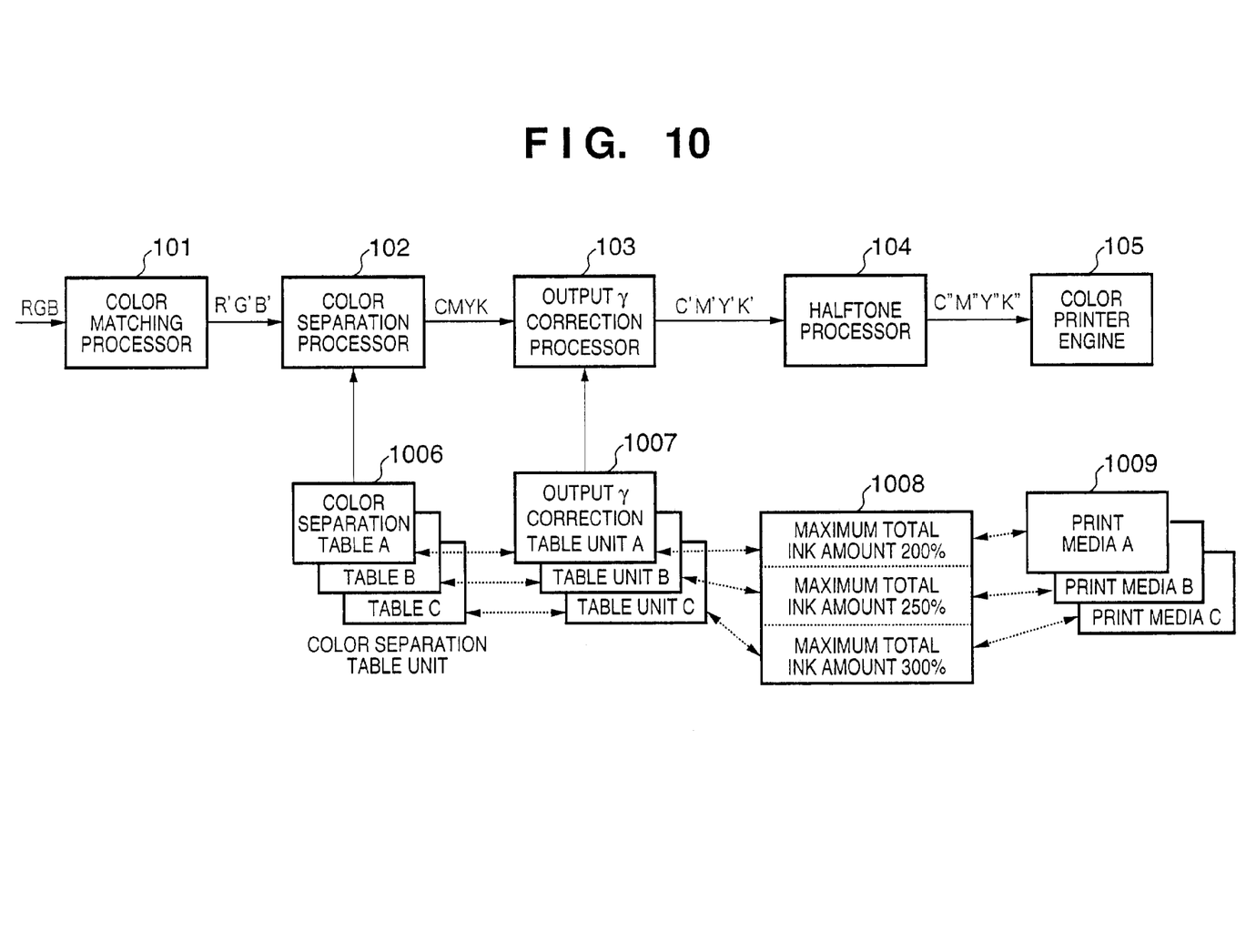
FIG. 10 is a block diagram showing the image processing apparatus according to the related art.

FIG. 10 shows an example of an image processing apparatus of a color printer related to the present invention. In FIG. 10, reference numeral 101 denotes a color matching processor; 102, a color separation processor; 103, an output γ correction processor; 104; a halftone processor; 105, a color printer engine; 1006, a color separation table unit; 1007, an output γ correction table unit; 1008, maximum total ink amounts; and 1009, print media.

The color matching processor 101 performs color matching processing for matching between color reproduction characteristics of input image data RGB and printer colors. The color separation processor 102 performs color separation processing by interpolation processing such as tetrahedral interpolation, from input multilevel R'G'B' image data to color-printer material colors (hereinbelow ink colors), cyan (C), magenta (M), yellow (Y) and black (K), based on table information of the color separation table unit 1006. The output γ correction processor 103 corrects gray scale characteristics of the multilevel CMYK data outputted from the color separation processor 102 via a 1-dimensional LUT (Look-up table) corresponding to the color reproduction characteristics of the color printer engine 105, and outputs multilevel C'M'Y'K' data. This processing realizes correction processing corresponding to the characteristics of the color printer.

Note that in the above-described image processing, a maximum value of the total CMYK ink discharge amount is defined by the combination of the color separation table unit 1006 and the output γ correction table unit 1007. The halftone processor 104 performs halftone processing for the printable number of grayscale levels, e.g., binarization if the printer is a binary printer, on the corrected multilevel C'M'Y'K' data, and outputs C"M"Y"K" binary data. The color printer engine 105 performs printing based on the input C"M"Y"K" binary data. The maximum total ink amounts 1008 indicate the total ink-amount maximum values allowable for the print media A to C 1009.

Especially in the related art of the present invention, optimum color separation tables and corresponding output γ correction tables are independently prepared for respective existing print media. For example, as tables for print processing for the print medium A, a color separation table A and an output γ correction table A are prepared. Further, as tables for the print processing for the print medium B, a color separation table B and an output γ correction table B are prepared. Further, as tables for the print processing for the print medium C, a color separation table C and an output γ correction table C are prepared. Further, as a maximum total CMYK ink-amount allowable for the print medium A is 200%, the maximum total CMYK ink amount defined by the combination of the color separation table A and an output γ correction table A is 200%. Similarly, regarding the print media B and C, the maximum total CMYK ink amounts are respectively 50% and 300%.

In a case where an unknown print medium which has not been expected as a medium to be used is employed, as a specified γ correction table does not exist, γ correction of CMYK colors is not appropriate, and the output γ characteristics are unbalanced.

Further, regarding the color separation table, as an appropriate color separation table does not exist, if a color separation table for an inappropriately large maximum total ink amount is used for the unknown print medium, the amount exceeds the ink absorbable amount and the ink overflows on the print medium.

On the other hand, if a color separation table for an inappropriately small maxim total ink amount is used, the range of color reproducibility is small although the range can be enlarged by using larger amounts of inks.

Further, in a case where a color separation table appropriate to an unexpected new print medium, as complicated processes are required, much time is required for generation of the color separation table, and the table cannot be easily generated.

SUMMARY OF THE INVENTION

Accordingly, the present invention has its object to provide an image processing apparatus, an image processing method and an image processing program which set an appropriate color separation table and an appropriate γ correction table with ease even for an unexpected new print medium.

According to the present invention, provided is an image processing apparatus which performs image processing on an unexpected new print medium by using an appropriate color separation table and an appropriate output γ correction table. The image processing apparatus which color-separates a color image signal into plural color-material colors is provided with plural color separation tables with stepwisely-different total use amounts of plural color-material colors and a γ correction table used upon correction of γ characteristics of the respective color-material colors in correspondence with image formation medium. The total use amount of each color separation table is calculated based on the γ correction table. Among the calculated plural total use amounts, an approximate value to a designated total use amount designated by a designation component or the like is determined. The color separation processing is performed based on a color separation table corresponding to the determined total use amount.

In the above construction, as an appropriate color separation table is selected from the plural color separation tables with stepwisely-different maximum total use amounts of color-material colors, color separation processing can be realized by using an appropriate color separation table for an unexpected new print medium. Further, complicated processes and time necessary for generating a new color separation table can be greatly reduced.

This arrangement mitigates the problem that the total color-material amount exceeds the color-material absorbable amount due to use of inappropriate color separation table and the problem that the range of color reproducibility in an image formation medium is narrowed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
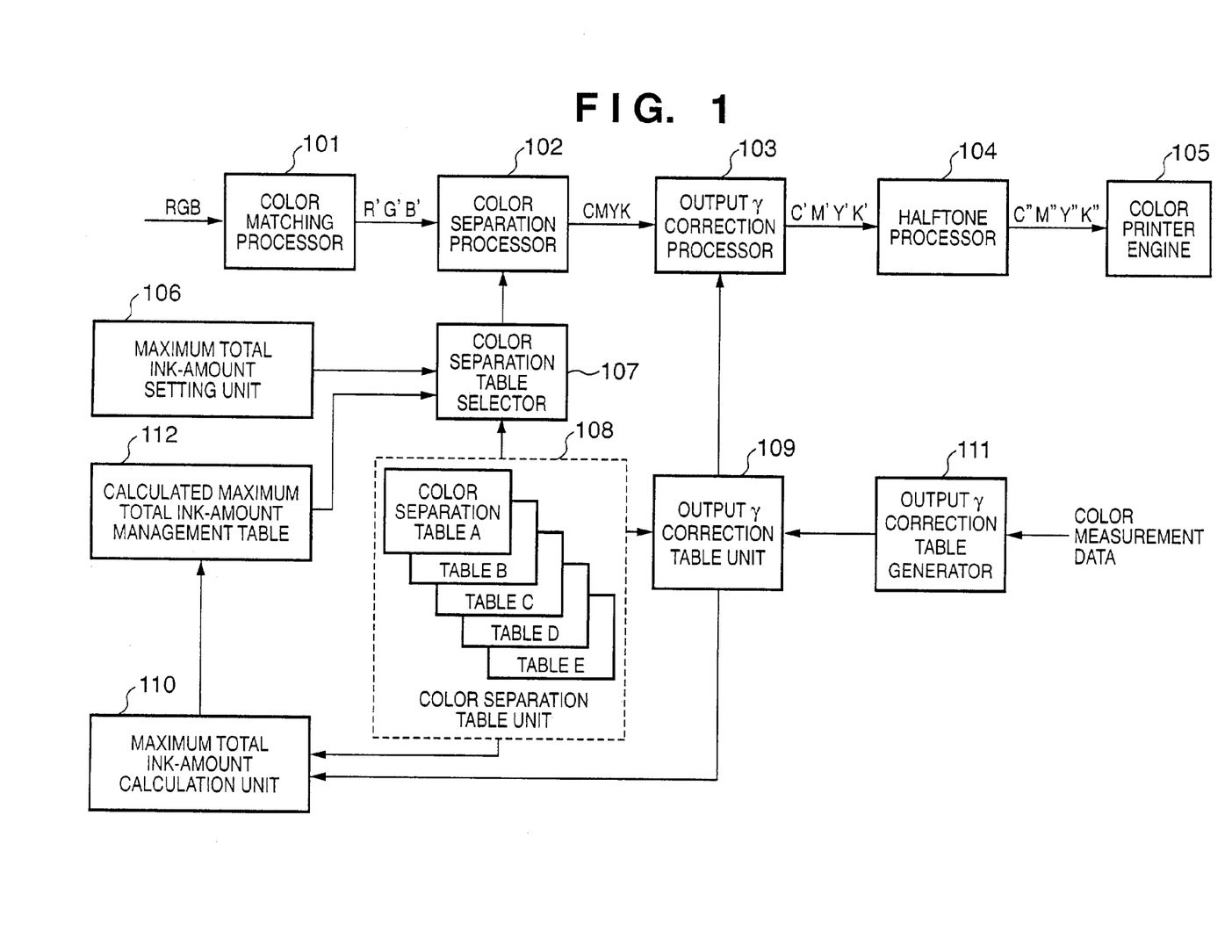
FIG. 1 is a block diagram showing a construction of an image processing apparatus according to a first embodiment of the present invention.

FIG. 1 is a block diagram showing a construction of an image processing apparatus according to a first embodiment of the present invention. In FIG. 1, numeral 101 denotes a color matching processor; 102, a color separation processor; 103, an output γ correction processor; 104, a halftone processor; 105, a color printer engine; 106, a maximum total ink-amount setting unit; 107, a color separation table selector; 108, a color separation table unit; 109, an output γ correction table unit; 110, a maximum total ink-amount calculation unit; and 111, an output γ correction table generator.

The color matching processor 101 performs processing for matching between color reproduction characteristics of input image data RGB and printer colors (color matching processing). For example, the color matching processor 101 performs 3-dimensional interpolation processing such as tetrahedral interpolation processing or cubic interpolation processing, based on contents of its internal color matching table, on the input RGB data thereby color-converts the data and outputs R'G'B' data.

The color separation processor 102 performs color separation processing in correspondence with a color separation table selected by the color separation table selector 107 thereby converts the input R'G'B' data into CMYK data and outputs the data. For example, the color separation processor 102 converts the input R'G'B' data into C (cyan), M (magenta), Y (yellow) and K (black) as color-material colors of the color printer by 3-dimensional interpolation processing such as tetrahedral interpolation processing or cubic interpolation processing based on the selected color separation table.

The output γ correction processor 103 performs γ correction processing on CMYK color-material color data for γ-correcting γ characteristics by the combination of processing content of the halftone processor 104 and the color printer engine 105. For example, the output γ correction processor 103 performs the correction processing based on the output γ correction table stored in the output γ correction table 109, thereby converts the CMYK color-material color data to multilevel C'M'Y'K' data and outputs the converted data.

The halftone processor 104 performs halftone processing to convert the multilevel C'M'Y'K' data from the output γ correction processor 103 to data of grayscale levels representable by the color printer engine 105.

The color printer engine 105 performs image formation processing on a print medium based on the C"M"Y"K" data from the halftone processor 104.

The maximum total ink-amount setting unit 106 holds a predetermined value set by a user from a property sheet of a printer driver. This value may be set from an operation panel of the printer main body.

The color separation table selector 107 selects an appropriate color separation table from plural color separation tables stored in the color separation table unit 108, based on information from the maximum total ink-amount setting unit 106 and the maximum total ink-amount calculation unit 110.

The color separation table 108 holds, e.g., 5-stage color separation tables A to E. The color separation tables A to E respectively correspond to one of 5-stage maximum total ink amounts. The maximum total ink amount means a maximum value of plural total ink amounts existing in a color separation table. The total ink amount means a total sum of respective CMYK ink discharge amounts necessary for representing a color.

The output γ correction table 109 holds a 1-dimensional table corresponding to the color-material colors (ink colors), C (cyan), M (magenta), Y (yellow), K (black) used in a color printer 203.

The maximum total ink-amount calculation unit 110 calculates the respective maximum total ink amounts for the respective color separation tables A to E, based on the contents of the output γ correction table stored in the output γ correction table unit 109.

The output γ correction table generator 111 generates the output γ correction table based on the result of color measurement from e.g. a computer connected to the printer, and stores the generated output γ correction table into the above-described output γ correction table unit 109.

The calculated maximum total ink-amount management table 112 holds correspondence between the color separation tables and the calculated maximum total ink amounts.

Figure 2:
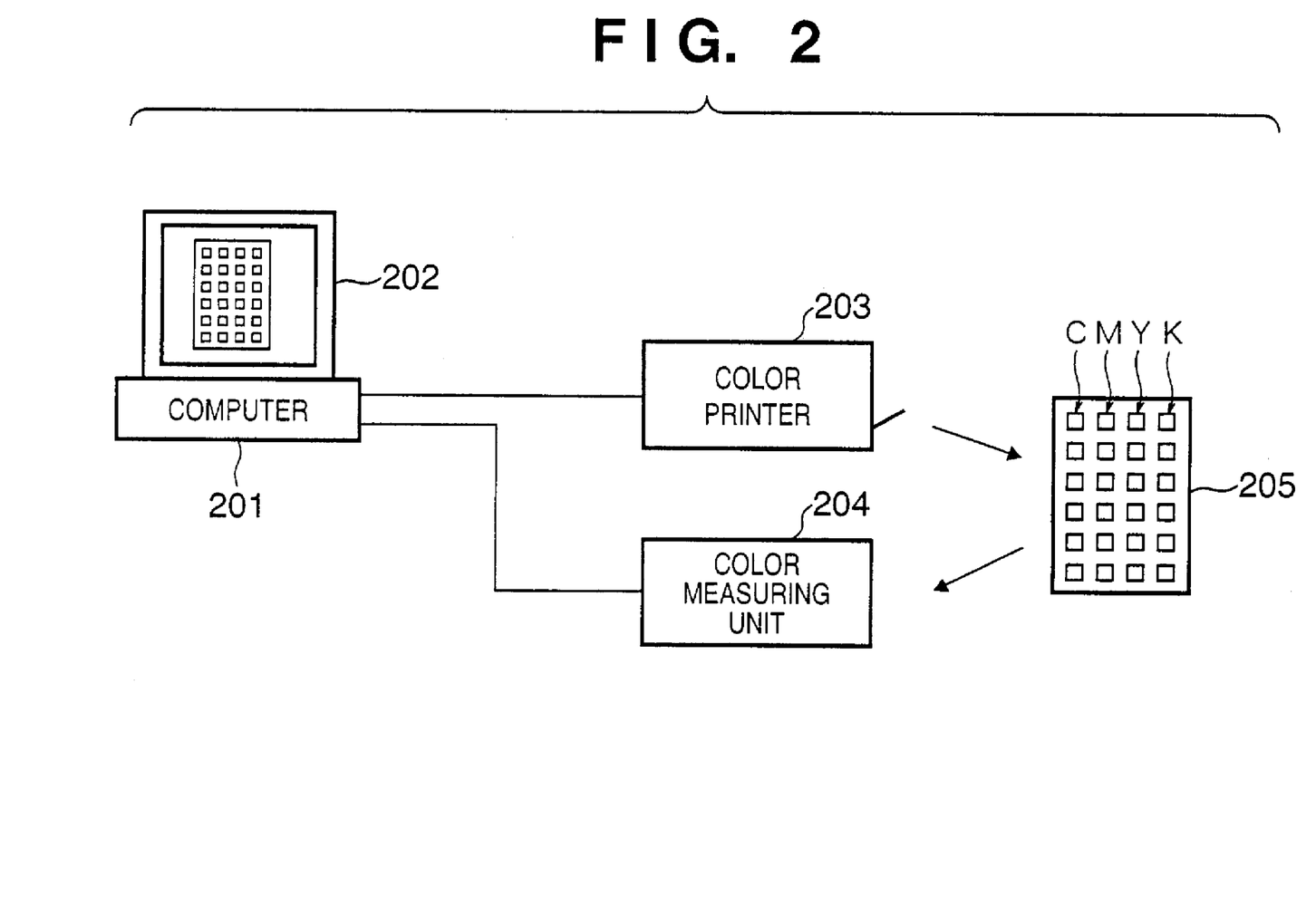
FIG. 2 is a block diagram showing a configuration of an image processing system according to the first embodiment.

FIG. 2 shows the configuration of an image processing system according to the present embodiment. Hereinbelow, a method for generating an output γ correction table appropriate to a print medium and a method for selecting an appropriate color separation table will be described in detail with reference to FIG. 2 and the subsequent figures. In the present embodiment, the construction of FIG. 1 is included in the color printer 203.

In FIG. 2, a computer 201 controls the color printer 203 and a color measuring unit 204. A monitor 202 displays data and the like held in the computer 201. The color printer 203 is a color printer for print-outputting image data. The color measuring unit 204 color-measures a patch 205 printed by the color printer 203. The image processing apparatus according to the present embodiment having the construction as shown in FIG. 1 is incorporated in the color printer 203.

Note that the computer 201, the color printer 203 and the color measuring unit 204 may be connected via any communication interface such as USB, IEEE 1394, Bluetooth, IEEE 802.3 or IEEE 802.11. For example, it may be arranged such that the color measuring unit 204 is connected to the computer 201 via USB, and plural color printers 203 are connected to the computer 201 via an IEEE 802.3 network.

Figure 3:
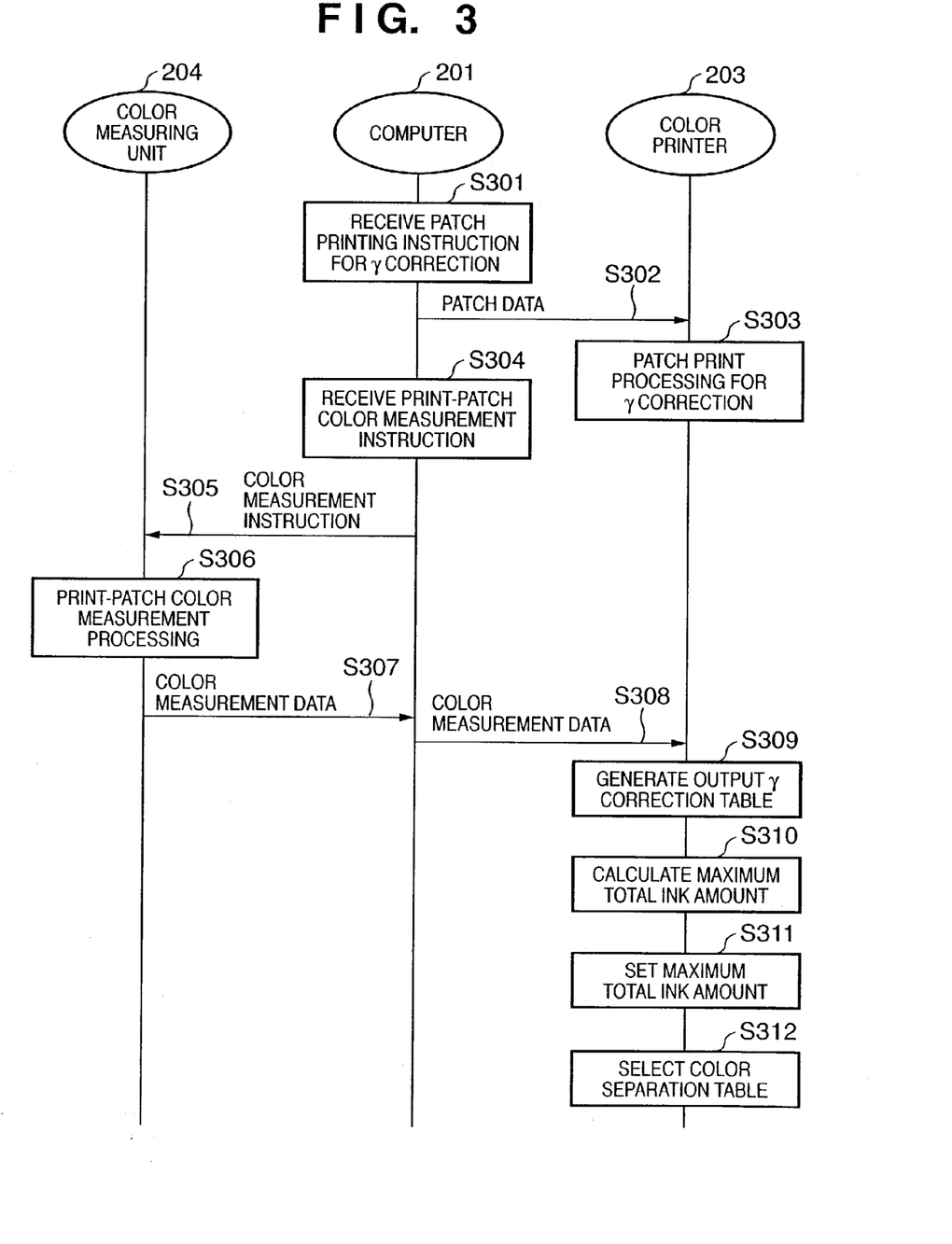
FIG. 3 is a flowchart showing a method for generating an output γ correction table and a method for selecting an appropriate color separation table for a new print medium.

FIG. 3 is a flowchart showing the method for generating an output γ correction table and the method for selecting an appropriate color separation table for a new print medium.

At step S301, the computer 201 receives a patch printing instruction for γ correction from the user. This instruction is issued by e.g. the user's clicking a button provided on the property sheet of the printer driver with a pointing device or the like.

At step S302, the computer 201 transfers patch data for formation of print patch to the color printer 203, and instructs to perform image formation.

At step S303, the color printer 203 forms an image of patch on the medium based on the received patch data by using the processing construction as shown in FIG. 1. That is, the patch printing is made through the processing by the halftone processor 104 to the color printer engine 105. FIG. 2 shows an example of the print patch 205 obtained as the result of printing. As shown in the figure, in the print patch 205, tonality characteristics of the CMYK primary colors as the color-material colors of the color printer are printed.

At step S304, the computer 201 receives the user's instruction for patch color measurement. This instruction is made by e.g. the user's clicking a button provided on the property sheet of the printer driver with a pointing device or the like.

At step S305, the computer 201 transmits a color measurement instruction to the color measuring unit 204.

At step S306, the color measuring unit 204 color-measures the γ correction print patch.

At step S307, the color measuring unit 204 transmits color measurement data obtained by the color measurement processing to the computer 201.

At step S308, the computer 201 transfers the color measurement data to the color printer 203.

At step S309, the color printer 203 performs the output γ correction table generation processing. More particularly, the output γ correction table generator 111 generates an output γ correction table based on the color measurement data from the computer 201, and stores the generated output γ correction table into the output γ correction table 109.

Figure 4:
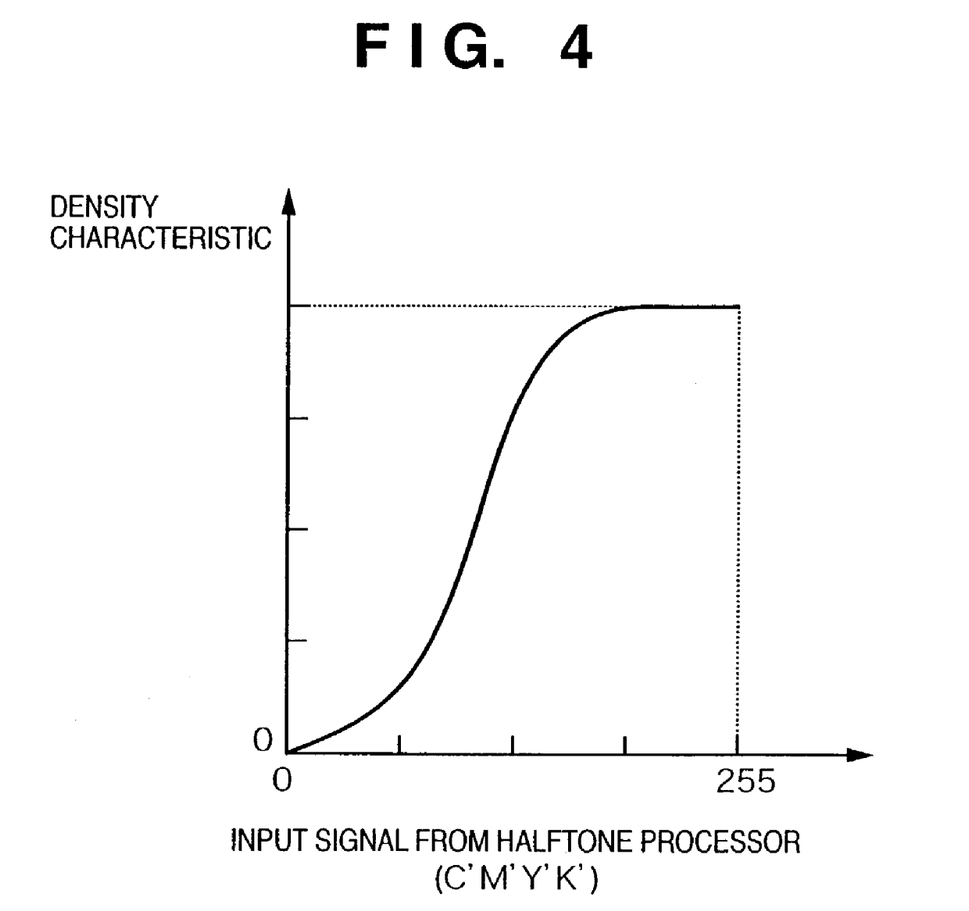
FIG. 4 is a graph showing an example of color measurement data.

FIG. 4 is a graph showing an example of color measurement data indicating the density characteristic of print result based on input signals (C'M'Y'K') from halftone processor.

Figure 5:
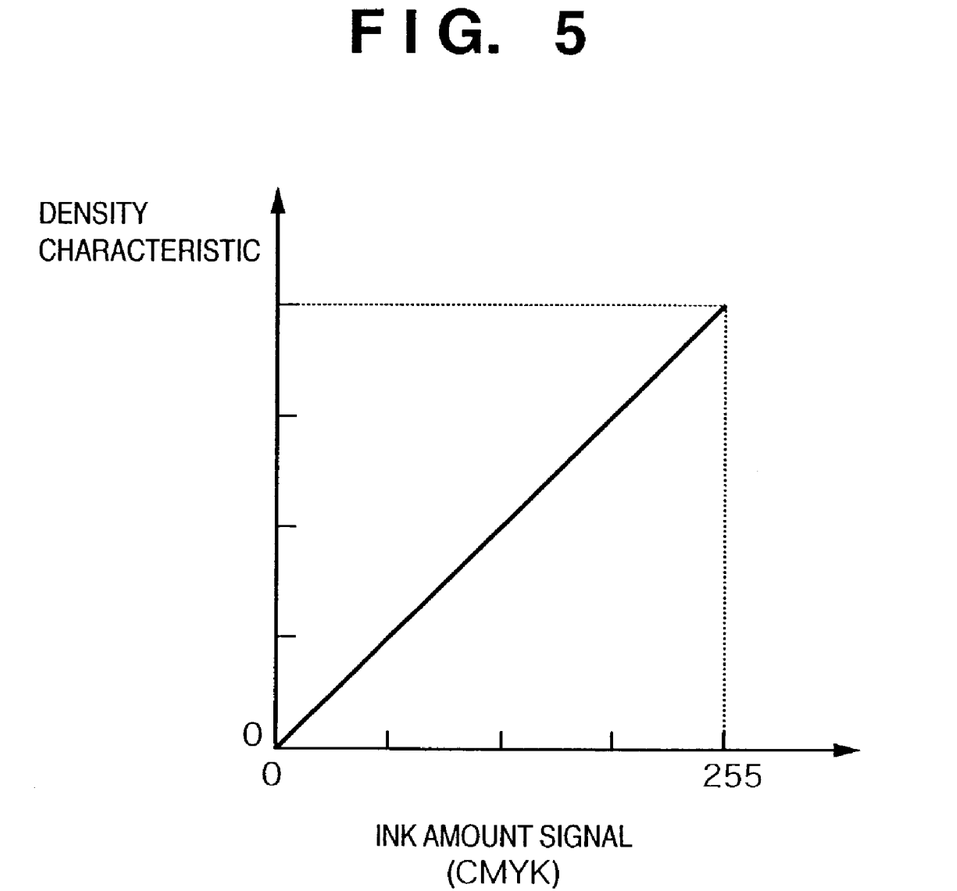
FIG. 5 is a graph showing an example of preferable printing characteristic.

FIG. 5 is a graph showing an example of preferable printing characteristic. As it is apparent from FIG. 4, if output γ correction is not performed for an unexpected new media, the characteristic is nonlinear. Accordingly, a 1-dimensional output γ correction table is generated for each of the CMYK color-material color for obtaining linear printing characteristic for the ink amount signal (CMYK) as shown in FIG. 5.

At step S310, the color printer 203 calculates a maximum total ink amount for each color separation table. More specifically, the color printer 203 sequentially reads the 5 color separation tables A to E from the color separation table unit 108, further reads the output γ correction table from the output γ correction table unit 109, then calculates the maximum total ink amounts of the respective color separation tables based on the read color separation tables and the output γ correction table. For example, upon calculation for 5 color separation tables, 5-stage maximum total ink amounts are obtained. The obtained maximum total ink amounts are stored into the calculated maximum total ink-amount management table 112.

Figure 6:
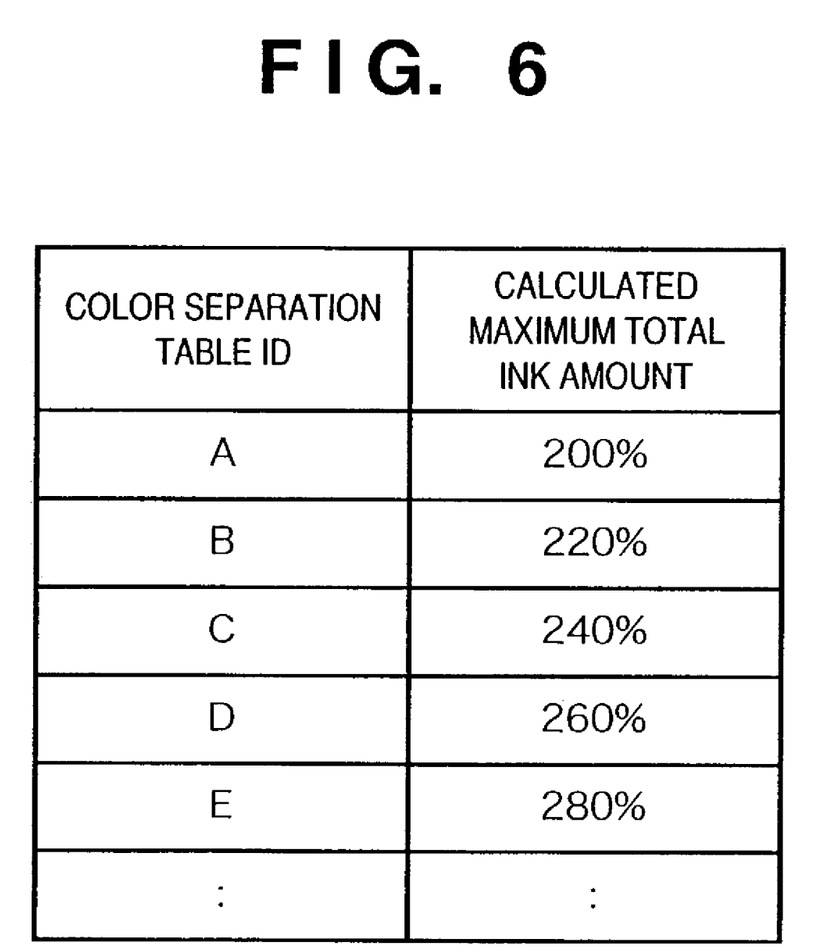
FIG. 6 is an example of a calculated maximum total ink-amount management table.

FIG. 6 is an example of the calculated maximum total ink-amount management table 112. It can be understood that IDs of the color separation tables and calculated maximum total ink amounts are stored in correspondence with each other.

At step S311, the color printer 203 sets the maximum total ink amount. More particularly, the maximum total ink-amount setting unit 106 stores a value set from the operation panel of the computer 201 or the color printer 203. That is, the user or the like operates the operation panel of the computer 201 or the color printer 203 to input a maximum total ink amount, thereby the maximum total ink amount is designated.

At step S312, the color printer 203 selects an appropriate one of the plural color separation tables stored in the color separation table unit 108. More particularly, the color separation table selector 107 reads the value stored in the maximum total ink-amount setting unit 106, and selects a color separation table corresponding to a calculated maximum total ink amount closest to the value.

For example, in a case where the set maximum total ink amount is 265%, and the maximum total ink amounts calculated for the respective color separation tables A to E are 200%, 220%, 240%, 260% and 280%, the color separation table selector 107 selects the color separation table D corresponding to the maximum total ink amount 260% closest to the set maximum total ink amount 265%.

Note that if the set maximum total ink amount is 275%, 280% is closer to the value than 260%. However, in this case, 260% is selected, since the ink overflows when the total ink amounts exceeds the set maximum total ink amount 275%.

As described above, plural color separation tables are prepared such that the maximum values of the CMYK total ink amounts are stepwisely different, and an output γ correction table for correcting output γ characteristics is generated for an unexpected new medium.

Then, maximum total ink amounts for the respective color separation tables are calculated based on the plural color separation tables and the output γ correction table, then an appropriate color separation table is selected based on the calculated maximum total ink amounts and a set maximum total ink amount, and color separation processing is performed by using the selected color separation table. As appropriate γ correction is performed on an unexpected new medium by the series of processings, the problem that the γ characteristics of the CMYK colors are unbalanced can be solved.

Further, as an appropriate color separation table for a print medium is selected from plural color separation tables prepared such that the maximum values of total CMYK ink amounts are stepwisely different, the problem that the total ink amount exceeds the ink absorbable amount of the medium and the problem that the range of color reproducibility is narrowed can be solved.

Further, as plural color separation tables are previously prepared, appropriate color separation processing can be performed on an unexpected print medium without generating a new color separation table.

Second Embodiment

In the first embodiment, all the functional constituents in the construction in FIG. 1 are provided on the color printer 203 side. In the present embodiment, the functional constituents except the color printer engine 105 are provided in the computer 201. That is, the functional constituents in FIG. 1 are included in the printer driver executed on the computer 201.

Figure 7:
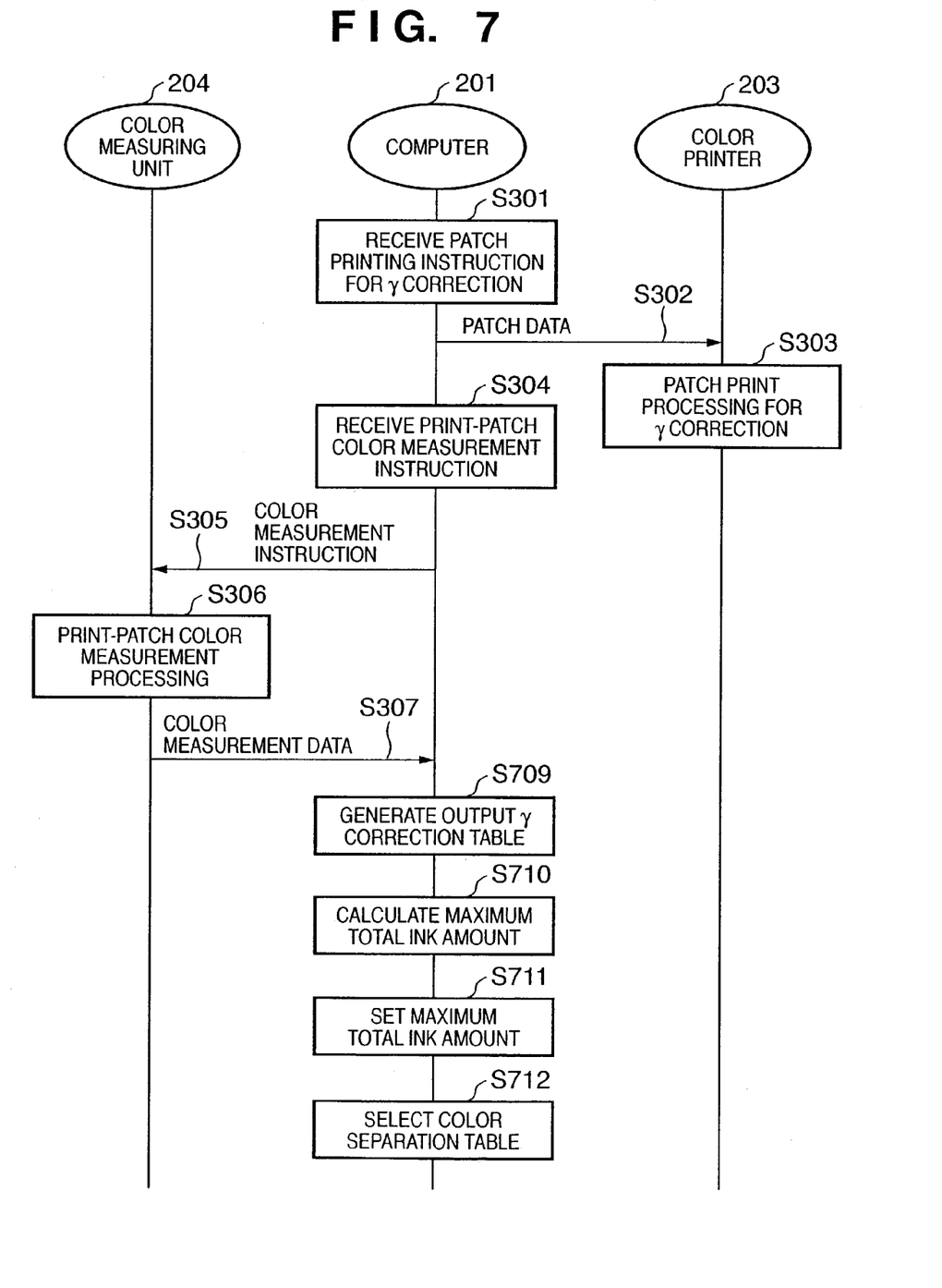
FIG. 7 is a flowchart showing the methods according to a second embodiment.

FIG. 7 is a flowchart showing the methods according to a second embodiment. In comparison with FIG. 3, it can be understood that steps S709 to S712 correspond to steps S309 to S312. That is, steps S709 to S712 are performed by the computer 201. Accordingly, the functional constituents in FIG. 1 are realized by execution of the printer driver to perform the respective steps according to the present embodiment on the computer.

The first embodiment provides a construction effective in a case where the image processing engine of the color printer 203 has a high performance. The second embodiment provides a construction effective in a case where the CPU of the computer 201 has a high performance. That is, in the second embodiment, even if the processing performance of the color printer 203 is not so high, the present invention can be applied to the system.

Third Embodiment

The present embodiment relates to an image processing system in which the color measuring unit 204 is directly connected to the color printer 203. That is, the color measuring unit and the color printer having USB, IEEE 1394 or Bluetooth interface can communicate with each other. Further, the color printer 203 has a driver software to control the color measuring unit 204.

Figure 8:
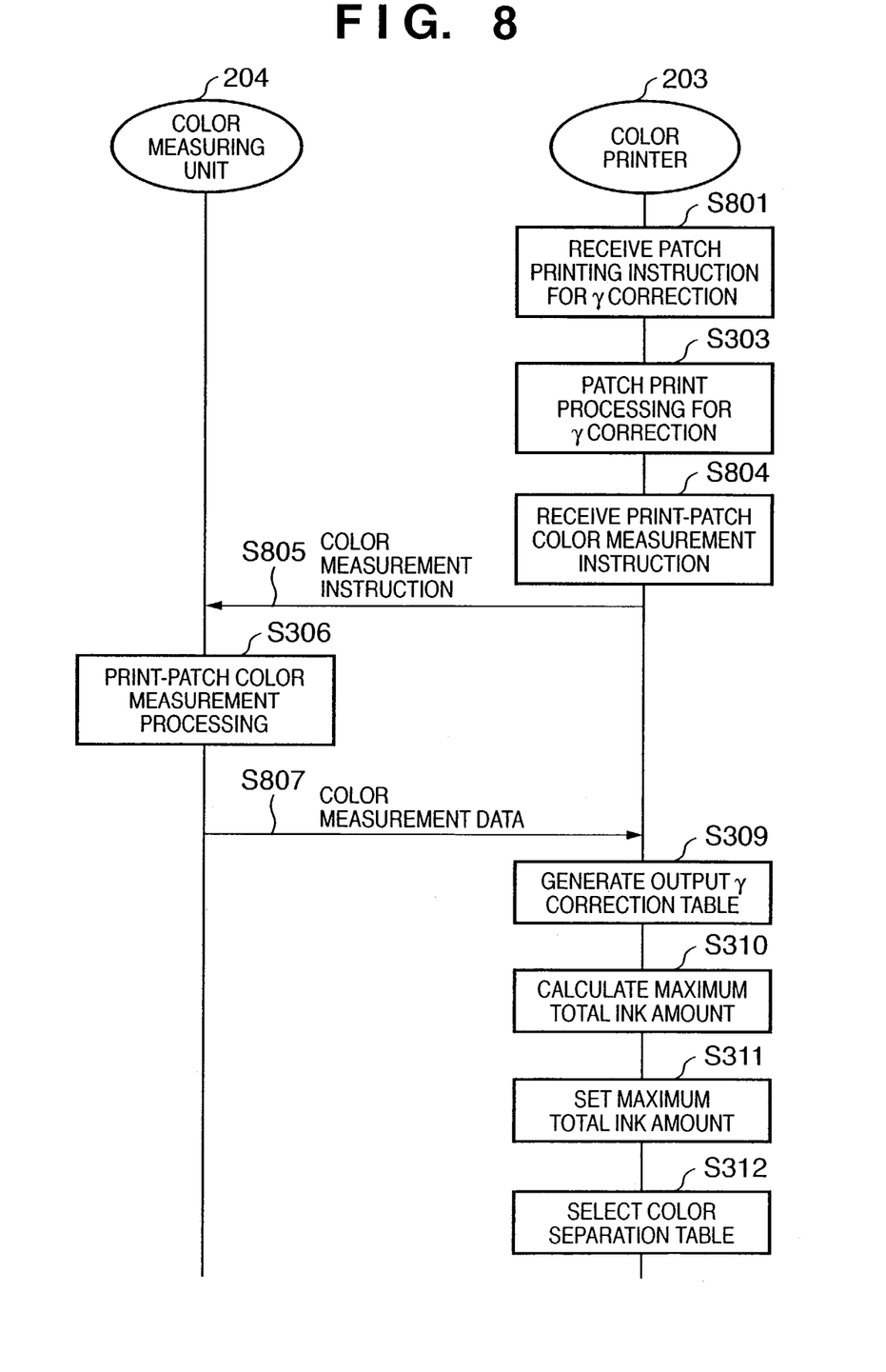
FIG. 8 is a flowchart showing the methods according to a third embodiment.

Step S804 corresponds to step S301; step S804, to step S304; step S805, to step S305; and step S807, to step S307.

At step S801, a patch printing instruction is issued from the operation panel of the color printer 203. Note that this instruction may be inputted into the color printer 203 by operating the color measuring unit 204.

At step S804, a print-patch color measurement instruction is transmitted from the color printer 203. This instruction may be inputted by directly operating the color measuring unit 204.

At step S805, the color measurement instruction is transmitted from the color printer 203 to the color measuring unit 204.

At step S807, color measurement data is transmitted from the color measuring unit 204 to the color printer 203.

In this manner, an output γ correction table appropriate to an unknown print medium can be generated, and further, a color separation table can be selected. Further, according to the present embodiment, the present invention can be applied without the computer 201. For example, the present embodiment is effective especially in a color printer which can be directly connected to a digital camera, a scanner or the like and which can handle image data obtained by image sensing without computer. Further, the digital camera, the scanner or the like can be utilized as the color measuring unit.

Fourth Embodiment

In the present embodiment, the present invention is applied to a color copier 900. That is, the color copier 900, having an image reading unit, an image processing unit and an image formation unit, can perform the processing according to the present invention by itself. Note that image data for patch formation is stored in a storage device of the color copier 900.

Figure 9:
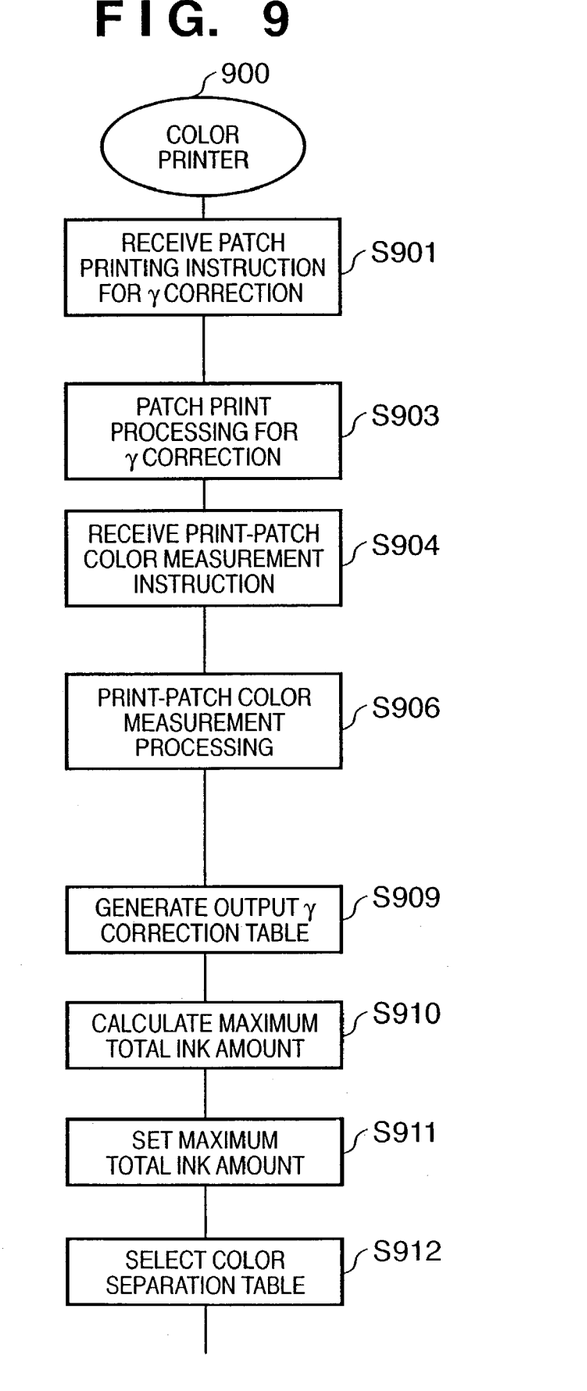
FIG. 9 is a flowchart showing the methods according to a fourth embodiment.

FIG. 9 is a flowchart showing the methods according to a fourth embodiment. Steps S901 to S912 correspond to steps 301 to S312.

At step S901, a patch printing instruction is issued from an operation panel of the color copier 900.

At step S903, the color copier 900 reads the image data for patch formation and performs printing processing. Thereafter, the print patch is set in the image reading unit of the color copier 900.

At step S904, a print-patch color measurement instruction is issued from the operation panel of the color copier 900.

At step S906, the print patch is read and color measurement is performed.

Thereafter, steps S909 to S912 are sequentially performed.

In this manner, according to the present embodiment, the present invention can be applied to the color copier 900. That is, the color copier 900 can perform copying processing appropriate to an unknown print medium.

Fifth Embodiment

In the above embodiments, an ink system using 4 cyan, magenta, yellow and black color inks as color-materials of the color printer is used. However, the ink system is not limited to this arrangement. The color printer may use a 6-color ink system further using pale cyan ink and pale magenta ink, or an ink system using color inks of red, green and the like. Further, the color material is not limited to ink but may be toner used in an electrophotography or the like.

Other Embodiment

Further, the object of the present invention can be also achieved by providing a storage medium holding software program code for performing the functions according to the above-described embodiments to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention.

Further, the storage medium, such as a flexible disk, a hard disk, an optical disk, a magneto-optical disk, a CD-ROM, a CD-R, a magnetic tape, a non-volatile type memory card, and a ROM can be used for providing the program code.

Furthermore, besides the functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion board which is inserted into the computer or in a memory provided in a function expansion unit which is connected to the computer, a CPU or the like contained in the function expansion board or unit performs a part or entire actual processing in accordance with designations of the program code and realizes the functions of the above embodiments.

Note that the present invention is also applicable to a case where the program is delivered from the storage medium holding the software program code for performing the functions according to the above-described embodiments to a demander via a communication line by personal computer communication or the like.

As described above, according to the present invention, the present invention provides an image processing apparatus for color-separating a color image signal into plural color-material colors, comprising: plural color separation tables set to have stepwisely-different total use amounts of plural color-material colors related to allowable use amount of color-material colors for an image formation medium as a subject of image formation; a $\gamma$ correction table used upon correction of respective $\gamma$ characteristics of the plural color-material colors regarding the image formation medium; a calculation component that calculates the total use amount for each of the plural color separation tables based on the $\gamma$ correction table; a determination component that determines a total use amount approximate to a designated total amount from the plural total use amounts calculated by the calculation component; and a color-separation processing component that performs color separation processing based on a color separation table corresponding to the total use amount determined by the determination component.

The total use amount is a maximum value of the total use amounts of the plural color-material colors in the color separation table. Further, the allowable use amount is a usable amount of color-material colors in the image formation medium such as an absorbable ink amount in the image formation medium. Note that if the allowable use amount is set to a maximum value of the absorbable amount, the color reproducibility can be increased while the ink overflow is prevented, however, the allowable use amount is may be appropriately set to a value less than the maximum value.

In the above construction, as an optimum color separation table is selected from plural color separation table components set to have stepwisely-different maximum values of total color-material amounts, color separation processing can be performed on an unexpected new print medium by using the appropriate color separation table without complicated processes and time necessary for generating a new color separation table.

This arrangement solves the problem that the total color material amount exceeds the color-material absorbable amount due to use of inappropriate color separation table and the problem that the range of color reproducibility in an image formation medium is narrowed.

Further, it may be arranged such that the image processing apparatus according to the present invention further comprises a generation component that generates the $\gamma$ correction table based on color measurement data obtained by color-measuring a $\gamma$ correction patch formed by an image formation component used upon the image formation.

In the above construction, as the $\gamma$ correction table is generated based on the color measurement data obtained by color-measuring the print patch formed on an unexpected print medium, $\gamma$ characteristics of CMYK colors can be corrected, and unbalanced output $\gamma$ characteristics can be calibrated.

Further, it may be arranged such that the image formation component is provided inside of the apparatus or connected to an external apparatus. For example, the present invention is applicable to an image formation apparatus including an image formation component and an image processing apparatus such as a color printer, a color facsimile apparatus or a color copier,. Further, in a case where the image formation component is connected to an external apparatus, the image processing apparatus can be realized as a computer or as a drive program, an application program or the like started on the computer.

Further, it may be arranged such that a color measurement component used upon color measurement of the $\gamma$ correction patch is provided inside of the apparatus or connected to an external apparatus.

The present invention is applicable to an image formation apparatus including a color measuring component such as a color printer, a color facsimile apparatus or a color copier. Further, in a case where the color measuring component is connected to an external apparatus, the image processing apparatus can be realized not only as the color printer, color facsimile apparatus or color copier but also as a computer or a drive program, an application program or the like started on the computer. Further, the image processing apparatus according to the present invention may be applied to an image reading apparatus such as a digital camera or a scanner.

Further, the plural color-material colors include 4 or more color-material colors such as cyan, magenta, yellow and black, or may further include pale cyan and pale magenta.

Note that the present invention also provides an image processing method and an image processing program corresponding to the above-described image processing apparatus.

As described above, according to the present invention, even regarding an unexpected print medium, $\gamma$ characteristics of color-material colors of a color printer can be appropriately corrected.

Further, color separation processing can be performed by using a color separation table appropriate to an unexpected print medium without complicated processes and time necessary for generating a new color separation table. This solves the problem that the total color material amount exceeds the color-material absorbable amount due to use of inappropriate color separation table and the problem that the range of color reproducibility in an image formation medium is narrowed.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for color-separating a color image signal into a plurality of color-material colors, comprising:
    a plurality of color separation tables set to have different total amounts of the plurality of color-material colors in a stepwise manner, each of the total amounts being related to an allowable use amount of the color-material colors for an image formation medium as a subject of image formation;
    a γ-correction table used when correcting γ characteristics of the plurality of color-material colors with respect to the image formation medium;
    calculating means for calculating a total use amount of the plurality of color-material colors for each of the color separation tables based on the γ-correction table;
    determining means for determining a total use amount approximate to a designated total amount from the plurality of calculated total use amounts; and
    color-separation processing means for performing color separation processing based on one of the color separation tables that corresponds to the determined total use amount.

2. An image processing apparatus according to claim 1, wherein the total use amount is a maximum total use amount value of the plurality of color-material colors in the corresponding color separation table.

3. An image processing apparatus according to claim 1 or 2, further comprising generating means for generating the γ-correction table based on color measurement data obtained by color-measuring a γ-correction patch formed by image forming means used when performing the image formation.

4. An image processing apparatus according to claim 3, wherein the image forming means is contained inside the apparatus or is externally connected to the apparatus.

5. An image processing apparatus according to claim 3, wherein color measuring means used upon color measurement of the γ-correction patch is contained inside the image processing apparatus or is externally connected to the apparatus.

6. An image processing apparatus according to claim 1 or 2, wherein the plurality of color-material colors includes four or more color-material colors.

7. An image processing apparatus according to claim 6, wherein the plurality of color-material colors includes cyan, magenta, yellow, and black colors.

8. An image processing apparatus according to claim 7, wherein the plurality of color-material colors further includes light cyan and light magenta colors.

9. An image processing method for color-separating a color image signal into a plurality of color-material colors, comprising:
    a calculating step for calculating a total use amount of the plurality of color-material colors for each of plural color separation tables, the total use amounts being calculated based on the plurality of color separation tables set to have different total amounts of the plurality of color-material colors in a stepwise manner, each of the total amounts being related to an allowable use amount of the color-material colors for an image formation medium as a subject of image formation, and also based on a γ-correction table used when correcting γ characteristics of the plurality of color-material colors with respect to the image formation medium;
    a determining step for determining a total use amount approximate to a designated total amount from the plurality of calculated total use amounts; and
    a color-separation processing step for performing color separation processing based on one of the color separation tables that corresponds to the determined total use amount.

10. An image processing method according to claim 9, wherein the total use amount is a maximum total use amount value of the plurality of color-material colors in the corresponding color separation table.

11. An image processing method according to claim 9 or 10, further comprising a generating step for generating the γ-correction table based on color measurement data obtained by color-measuring a γ-correction patch formed by image forming apparatus used when performing the image formation.

12. An image processing method according to claim 11, further comprising a step for performing the image formation.

13. An image processing method according to claim 11, further comprising a color measuring step performed for color measurement of the γ-correction patch.

14. An image processing method according to claim 9 or 10, wherein the plurality of color-material colors includes four or more color-material colors.

15. An image processing method according to claim 14, wherein the plurality of color-material colors includes cyan, magenta, yellow, and black colors.

16. An image processing method according to claim 15, wherein the plurality of color-material colors further includes light cyan and light magenta colors.

17. A computer-readable medium, encoding an image processing program for allowing a computer to include:
    calculating means for calculating a total use amount of a plurality of color-material colors for each of color separation tables, the total use amounts being calculated based on the plurality of color separation tables set to have different total amounts of the plurality of color-material colors in a stepwise manner, each of the total amounts being related to an allowable use amount of the color-material colors for an image formation medium as a subject of image formation, and also based on a γ-correction table used when correcting γ characteristics of the plurality of color-material colors with respect to the image formation medium;
    determining means for determining a total use amount approximate to a designated total amount from the plurality of calculated total use amounts; and
    color-separation processing means for performing color separation processing based on one of the color separation tables that corresponds to the determined total use amount.

18. A computer-readable medium according to claim 17, wherein the program allows the computer to further include:
    first controlling means for forming a γ-correction patch by controlling an image forming apparatus connected to the computer;
    second controlling means for controlling a color measuring apparatus for color-measuring the γ-correction patch in order to obtain color measurement data; and generating means for generating the γ-correction table based on the color measurement data.

19. A computer-readable medium according to claim 17 or 18, wherein the image processing program comprises a plurality of software programs executed on a single computer or dispersedly executed on a plurality of computers.

* * * * *